US009469205B2

(12) United States Patent
Kwon et al.

(10) Patent No.: US 9,469,205 B2
(45) Date of Patent: Oct. 18, 2016

(54) FEMALE CONNECTOR OF HIGH VOLTAGE JUNCTION BOX AND METHOD FOR ASSEMBLING THE SAME

(71) Applicants: Hyundai Motor Company, Seoul (KR); Kia Motors Corporation, Seoul (KR); Korea Electric Terminal Co., Ltd., Incheon (KR)

(72) Inventors: Beom Joo Kwon, Gyeonggi-Do (KR); Myeong Sun Choi, Gyeonggi-Do (KR); Chang Hyun Yoo, Incheon (KR)

(73) Assignees: Hyundai Motor Company, Seoul (KR); Kia Motors Corporation, Seoul (KR); Korea Electric Terminal Co., Ltd., Incheon (KR)

( * ) Notice: Subject to any disclaimer, the term of this patent is extended or adjusted under 35 U.S.C. 154(b) by 0 days.

(21) Appl. No.: 14/752,957

(22) Filed: Jun. 28, 2015

(65) Prior Publication Data
US 2016/0089993 A1    Mar. 31, 2016

(30) Foreign Application Priority Data

Sep. 25, 2014    (KR) .................. 10-2014-0128683

(51) Int. Cl.
*H01R 12/00*    (2006.01)
*H05K 1/00*    (2006.01)
*B60L 11/18*    (2006.01)
*H01R 43/20*    (2006.01)
(Continued)

(52) U.S. Cl.
CPC .......... *B60L 11/1816* (2013.01); *H01R 13/46* (2013.01); *H01R 13/73* (2013.01); *H01R 43/20* (2013.01)

(58) Field of Classification Search
CPC .... B60L 11/1816; B60L 11/18; H01R 13/46; H01R 43/20; H01R 13/73
USPC ............................. 439/76.2, 34, 535; 29/876
See application file for complete search history.

(56) References Cited

U.S. PATENT DOCUMENTS 5,501,605 A *  3/1996  Ozaki ................. B60R 16/0207
174/72 A
2005/0221640 A1   10/2005  Saka
(Continued)

FOREIGN PATENT DOCUMENTS

JP    2005-295735 A    10/2005
JP    2008-283760 A    11/2008
JP    2012-075286 A    4/2012
(Continued)

*Primary Examiner* — Javaid Nasri
(74) *Attorney, Agent, or Firm* — Mintz Levin Cohn Ferris Glovsky and Popeo, P.C.; Peter F. Corless

(57) ABSTRACT

A female connector of a high voltage junction box includes a first case and a second case that are coupled to form a space for accommodation of electric wiring, a connector housing configured as a pipe at one side of the first case and having an internal opening portion that is closed via coupling with a holder formed in the second case, and a bus bar extending from the electric wiring, inserted into the connector housing, and fixed to the connector housing by the holder. A method for assembling the female connector includes holding electric wiring on a first case to insert a bus bar formed on the electric wiring into a connector housing formed on the first case for connection with external wiring; coupling the first case and the second case to fix the bus bar; and forming a space for accommodation of the electric wiring.

10 Claims, 6 Drawing Sheets

(51) Int. Cl.
*H01R 13/73* (2006.01)
*H01R 13/46* (2006.01)

(56) References Cited

U.S. PATENT DOCUMENTS

2012/0064741 A1 3/2012 Kawaguchi et al.
2012/0252234 A1 10/2012 Kobayashi et al.

FOREIGN PATENT DOCUMENTS

| JP | 2012-085506 A | 4/2012 |
| JP | 2012-105376 A | 5/2012 |
| KR | 10-2009-0119182 | 11/2009 |
| KR | 101364164 B1 | 2/2014 |
| KR | 10-2014-0050261 A | 4/2014 |

* cited by examiner

FEMALE CONNECTOR OF HIGH VOLTAGE JUNCTION BOX AND METHOD FOR ASSEMBLING THE SAME

CROSS-REFERENCE TO RELATED APPLICATION

This application claims under 35 U.S.C. §119(a) the benefit of Korean Patent Application No. 10-2014-0128683, filed on Sep. 25, 2014 in the Korean Intellectual Property Office, the entire contents of which are incorporated herein by reference.

BACKGROUND (a) Technical Field

The present invention relates to a female connector of a high voltage junction box and a method for assembling the same, and more particularly, to a female connector of a high voltage junction box which is prevented from being disassembled by external force generated during driving.

(b) Description of the Related Art

A significant amount of vibration and impact are generated in a vehicle during driving. Thus, a connector for connection of a battery and an electric sub assembly 600 needs to be prevented from being disassembled due to vibration and impact.

When mount portions into which a male connector is inserted are formed by combining a plurality of cases with a female connector, a gap may be generated between the plurality of cases due to vibration and impact, and the male connector may be separated from the mount portion of the female connector due to the generated gap.

SUMMARY

An aspect of the present invention provides a female connector of a high voltage junction box which is prevented from being disassembled by vibration and impact generated during driving, and a method for assembling the same.

According to an exemplary embodiment of the present invention, a female connector of a high voltage junction box includes a first case and a second case that are coupled to form a space for accommodation of electric wiring, a connector housing configured as (i.e., formed like or in the manner of) a pipe at one side of the first case and having an internal opening portion that is closed via coupling with a holder formed in the second case, and a bus bar extending from the electric wiring, inserted into the connector housing, and fixed to the connector housing by the holder.

According to an exemplary embodiment of the present invention, a method for assembling a female connector of a high voltage junction box includes holding electric wiring on a first case so as to insert a bus bar formed on the electric wiring into a connector housing formed on the first case for connection with external wiring, and coupling the first case and the second case to fix the bus bar and form a space for accommodation of the electric wiring.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
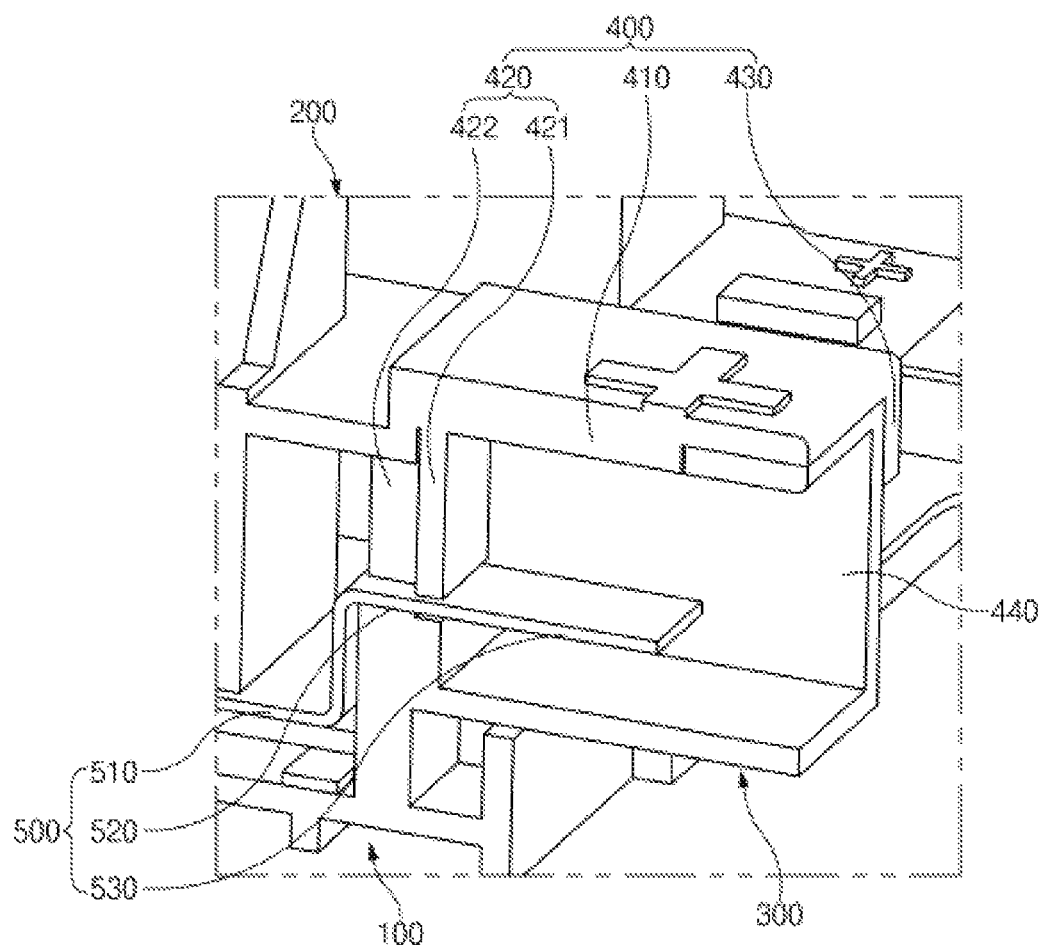
FIG. 1 is a perspective cross-sectional view of a female connector of a high voltage junction box according to an exemplary embodiment of the present invention.
Figure 2:
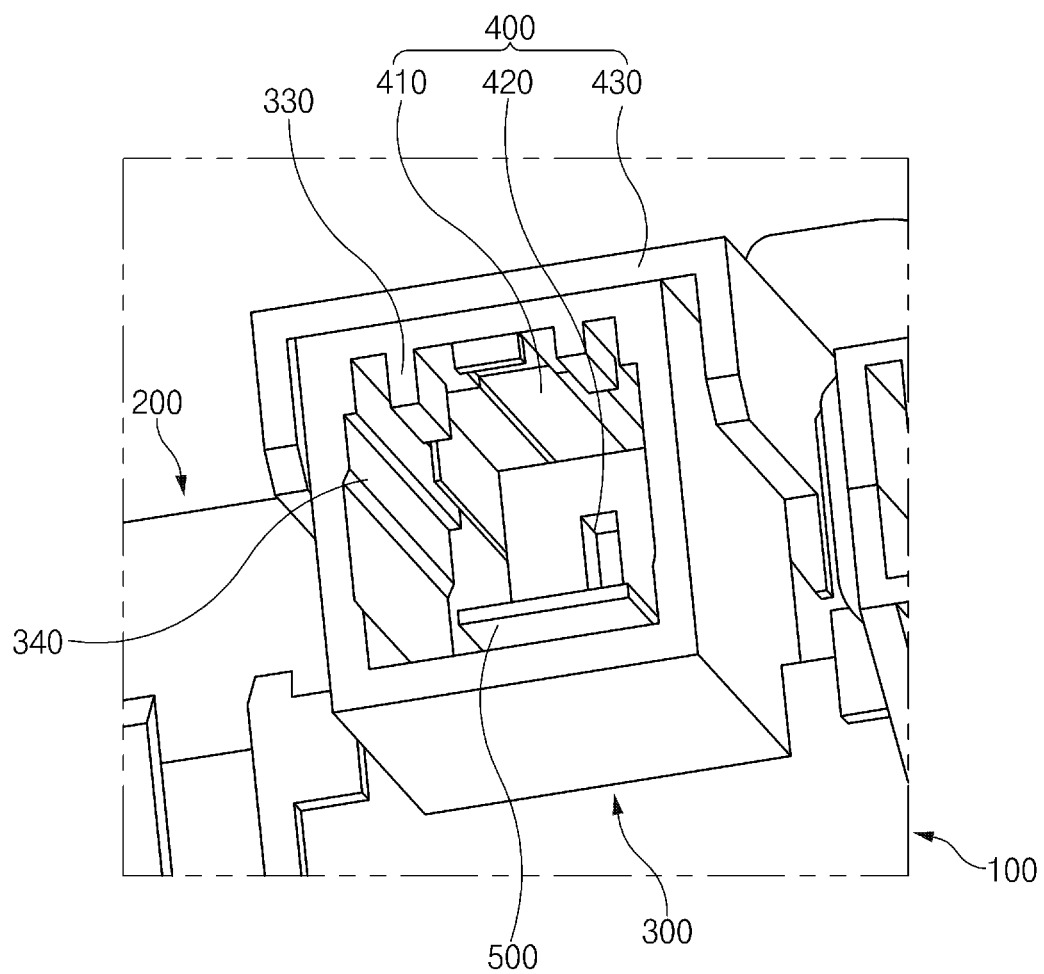
FIG. 2 is a perspective view of the female connector of the high voltage junction box of FIG. 1.

Exemplary embodiments will now be described more fully with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

As illustrated in FIGS. 1 to 4, a female connector of a high voltage junction box according to an exemplary embodiment of the present invention includes a first case 100 and a second case 200 that are coupled to form a space 440 for accommodation of electric wiring, a connector housing 300 configured as (i.e., formed like or in the manner of) a pipe at one side of the first case 100 and having an internal opening portion that is closed via coupling with a holder 400 formed in the second case 200, and a bus bar 500 that extends from the electric wiring, is inserted into the connector housing 300, and fixed to the connector housing 300 by the holder 400.

The first case 100 is relatively positioned below the second case 200, and the second case 200 is positioned above the first case 100 such that the second case 200 is coupled to and covers the first case 100. A space 440 is formed between the first case 100 and the second case 200, and electric wiring is formed in the space 440. The connector housing 300 is positioned at one side of the first case 100 and the second case 200 that are coupled to each other.

The connector housing 300 includes a coupling groove 310 formed from one side of the internal opening portion in a longitudinal direction of the connector housing 300, a holding stage 320 protruding on the internal opening portion toward a central axis of the connector housing 300, and a male connector coupling protrusion 330 formed in a vertical direction toward a longitudinal central axis of the connector housing 300 from the coupling groove 310. According to an exemplary embodiment of the present invention, the coupling groove 310 is formed in parallel to the second case 200.

The connector housing 300 further includes a guide 340 having the same shape as an outer appearance of a male connector inserted into the connector housing 300 from the outside and formed on an internal side surface of the connector housing 300.

Figure 3:
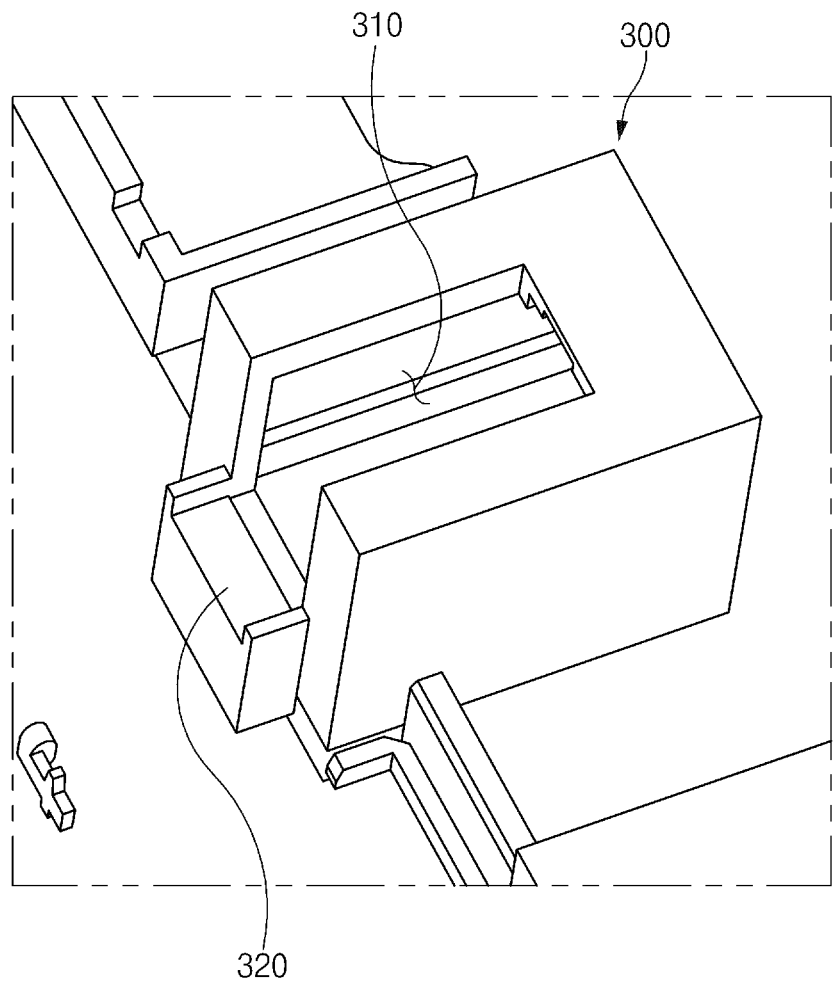
FIG. 3 is a perspective view of a first case included in the female connector of the high voltage junction box of FIG. 1.
Figure 4:
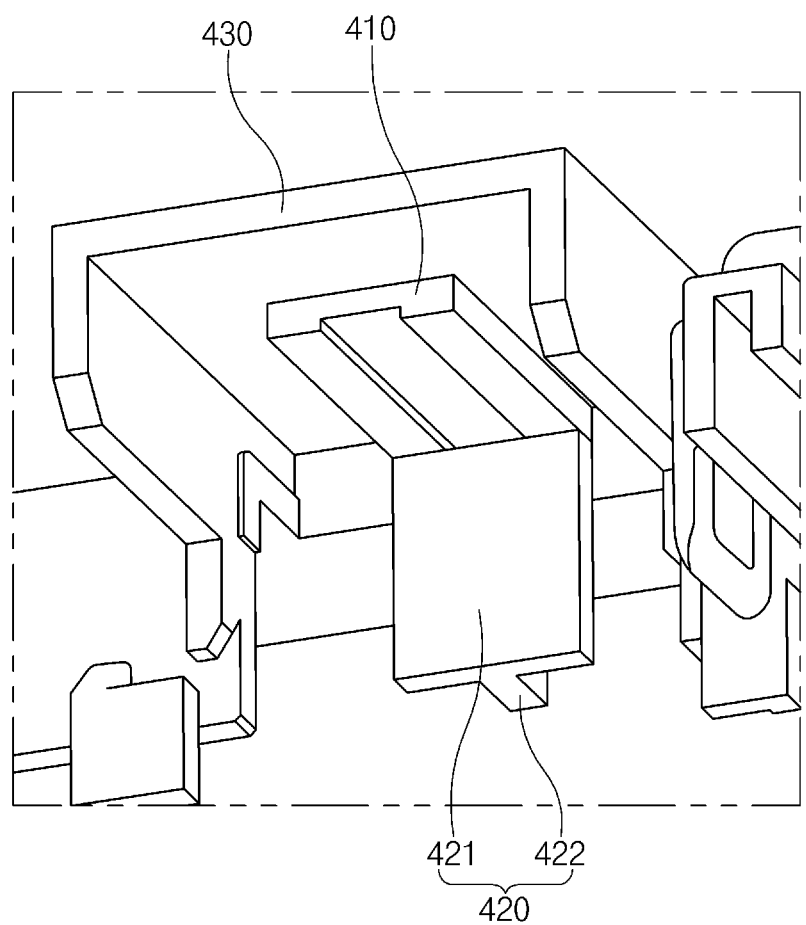
FIG. 4 is a perspective view of a second case included in the female connector of the high voltage junction box of FIG. 1.

The connector housing 300 according to an exemplary embodiment of the present invention is formed in the first case 100 like a hexahedron having an open front surface, and a male connector is inserted into the connector housing 300 through the open front surface. As illustrated in FIGS. 1 and 3, an upper surface of the connector housing 300 is opened to form the coupling groove 310.

The holder 400 includes a spacer 410 inserted into the coupling groove 310, a pressing portion 420 extending from the spacer 410 so as to be perpendicular to the holding stage 320, and a cover portion 430 formed on the spacer 410 so as to cover an external opening portion of the connector housing 300 from the internal opening portion.

The pressing portion 420 includes a vertical surface portion 421 having the same width as the holding stage 320, and a reinforcing surface portion 422 protruding toward an internal portion of the first case 100 in a longitudinal direction of the vertical surface portion 421 and having a bottom surface that contacts the bus bar 500 held on the holding stage 320.

The cover portion 430 closes a coupling groove formed on an upper surface of the connector housing 300 together with the spacer 410 and simultaneously, partially hides opposite side surfaces of the connector housing 300. The upper surface of the connector housing 300 contacts both the opposite side surfaces, and thus the cover portion 430 may fix the connector housing 300 to the second case 200.

Since the connector housing 300 has a hexahedral shape, a coupling state between the connector housing 300 and the male connector inserted thereinto is strongly maintained. Positions of the first case 100 and the second case 200 are maintained by the cover portion 430.

The spacer 410 and the pressing portion 420 close the internal opening portion of the connector housing 300 and simultaneously press the bus bar 500 held on the holding stage 320 so as to fix the bus bar 500 to the connector housing 300.

The bus bar 500 includes a bus bar internal portion 510 positioned in the first case 100, a bus bar bent portion 520 extending and bent from the bus bar internal portion 510 and held on the holding stage 320 formed on the connector housing 300, and a bus bar connecting portion 530 extending from the bus bar bent portion 520 and inserted into the connector housing 300 while being spaced apart from an internal side surface of the connector housing 300 by a predetermined distance. The bus bar connecting portion 530 may contact the male connector so as to electrically connect electric wiring to the male connector.

Figure 5A:
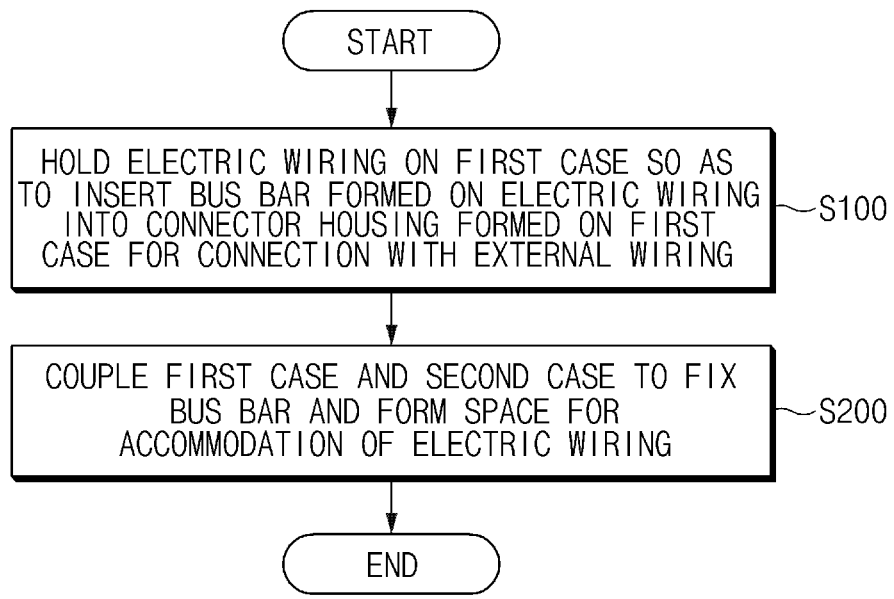
FIGS. 5A-5B are flowcharts of a method for assembling a female connector of a high voltage junction box according to an exemplary embodiment of the present invention.
Figure 5B:
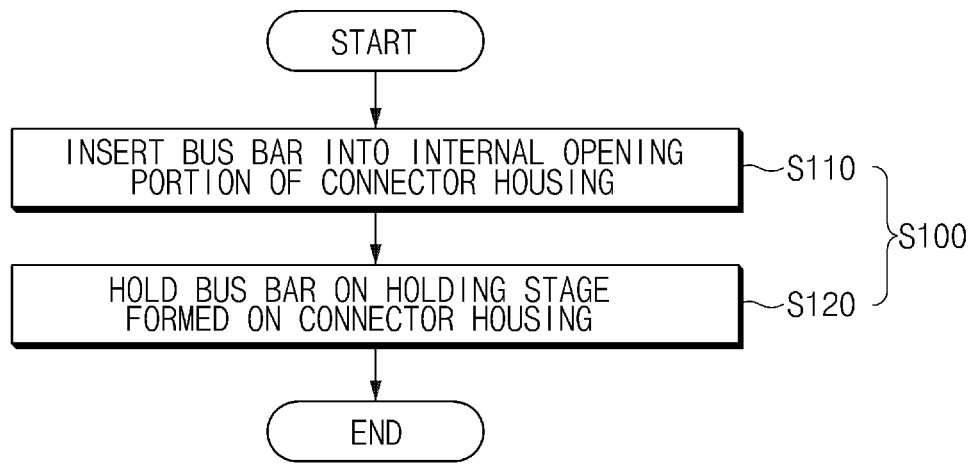

The female connector of the high voltage junction box configured as described above according to an exemplary embodiment of the present invention is assembled as illustrated in flowcharts of FIGS. 5A-5B.

Figure 6:
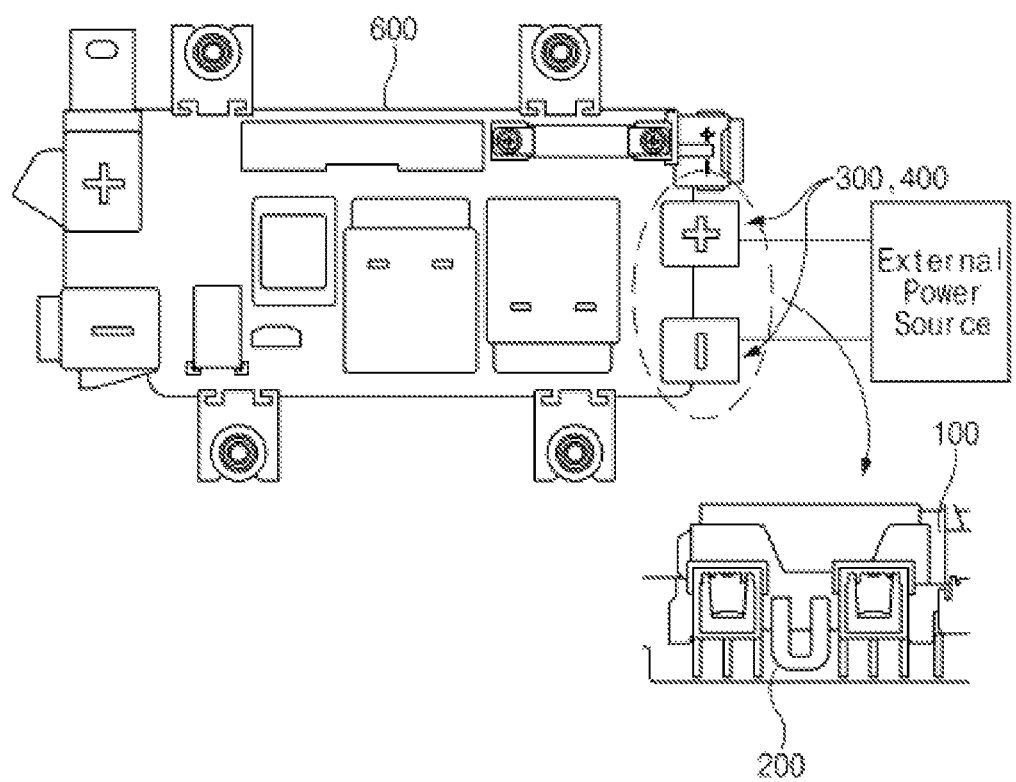
FIG. 6 is a perspective view of a female connector of a high voltage junction box, which has been assembled using the method for assembling the female connector of the high voltage junction box of FIGS. 5A-5B.

As illustrated in FIGS. 5A-5B and 6, a method for assembling a female connector of a high voltage junction box according to an exemplary embodiment of the present invention includes holding electric wiring on the first case 100 so as to insert the bus bar 500 formed on the electric wiring into a connector housing formed on the first case 100 for connection with external wiring (S100), and coupling the first case 100 and the second case 200 to fix the bus bar 500 and forming a space 440 for accommodation of the electric wiring (S200).

The holding of the electric wiring (S100) includes inserting the bus bar 500 into an internal opening portion of the connector housing (S110), and holding the bus bar 500 on the holding stage 320 formed on the connector housing (S120).

The above step will be described in greater detail below. The electric wiring is held on the first case 100. In this case, one end portion of the bus bar 500 extending from the electric wiring is inserted into the connector housing 300 and the bus bar bent portion 520 is held on the holding stage 320.

In the forming of the space 440 (S200), the spacer 410 included in the second case 200 is inserted into the coupling groove 310 formed in the first case 100, and the pressing portion 420 included in the second case 200 presses the holding stage 320 formed on the first case 100 to fix the bus bar 500 held on the holding stage 320.

The bus bar connecting portion 530 extends in the form of a cantilever on the holding stage 320 and is positioned in the connector housing 300. The bus bar connecting portion 530 is electrically connected to a male connector inserted into the connector housing 300.

According to a female connector of a high voltage junction box and a method for assembling the same according to the above exemplary embodiments of the present invention, since a gap is not present in a connector housing into which a male connector is inserted, the connector housing is not deformed by external vibration or impact, thereby preventing the male connector inserted into the connector housing from being separated from the connector housing.

While exemplary embodiments have been shown and described above, it will be apparent to those skilled in the art that modifications and variations could be made without departing from the scope of the present invention as defined by the appended claims.

What is claimed is:

1. A female connector of a high voltage junction box, comprising:
   a first case and a second case that are coupled to form a space for accommodation of electric wiring;
   a connector housing configured as a pipe at one side of the first case and having an internal opening portion that is closed via coupling with a holder formed in the second case; and
   a bus bar extending from the electric wiring, inserted into the connector housing, and fixed to the connector housing by the holder,
   wherein the connector housing includes:
   a coupling groove formed from one side of the internal opening portion in a longitudinal direction of the connector housing;
   a holding stage protruding on the internal opening portion toward a central axis of the connector housing; and
   a male connector coupling protrusion formed in a vertical direction toward a longitudinal central axis of the connector housing from the coupling groove.

2. The female connector according to claim 1, wherein the bus bar includes;
   a bus bar internal portion positioned in the first case;
   a bus bar bent portion extending and bent from the bus bar internal portion and held on the holding stage formed on the connector housing; and
   a bus bar connecting portion extending from the bus bar bent portion and inserted into the connector housing while being spaced apart from an internal side surface of the connector housing by a predetermined distance.

3. The female connector according to claim 1, wherein the coupling groove is formed in parallel to the second case.

4. The female connector according to claim 1, wherein the connector housing further includes a guide having the same shape as an outer appearance of a male connector inserted into the connector housing from the outside and formed on an internal side surface of the connector housing.

5. The female connector according to claim 1, wherein the holder includes:
   a spacer inserted into the coupling groove;
   a pressing portion extending from the spacer so as to be perpendicular to the holding stage; and
   a cover portion formed on the spacer so as to cover an external opening portion of the connector housing from the internal opening portion.

6. The female connector according to claim 5, wherein the pressing portion includes:
   a vertical surface portion having the same width as the holding stage; and
   a reinforcing surface portion protruding toward an internal portion of the first case in a longitudinal direction of the vertical surface portion and having a bottom surface that contacts the bus bar held on the holding stage.

7. A female connector of a high voltage junction box, comprising:
   a first case and a second case that form a space for accommodation of an electric sub assembly of a vehicle;
   a connector housing formed on the first case and including an insertion space into which an external power source is inserted and which connects the external power source to the electric sub assembly; and
   a housing cover formed at the second case coupled to the first case and coupled to the connector housing to cover the insertion space,
   wherein the connector housing includes:
   a coupling groove formed from one side of the internal opening portion in a longitudinal direction of the connector housing;
   a holding stage protruding on the internal opening portion toward a central axis of the connector housing; and
   a male connector coupling protrusion formed in a vertical direction toward a longitudinal central axis of the connector housing from the coupling groove.

8. A method for assembling a female connector of a high voltage junction box, the method comprising the steps of:
   holding electric wiring on a first case so as to insert a bus bar formed on the electric wiring into a connector housing formed on the first case for connection with external wiring;
   coupling the first case and a second case to fix the bus bar; and
   forming a space for accommodation of the electric wiring,
   wherein the connector housing includes:
   a coupling groove formed from one side of the internal opening portion in a longitudinal direction of the connector housing;
   a holding stage protruding on the internal opening portion toward a central axis of the connector housing; and
   a male connector coupling protrusion formed in a vertical direction toward a longitudinal central axis of the connector housing from the coupling groove.

9. The method according to claim 8, wherein the holding step further comprises:
   inserting the bus bar into the internal opening portion of the connector housing; and
   holding the bus bar on the holding stage formed on the connector housing.

10. The method according to claim 8, wherein the forming step further comprises:
    inserting a space included in the second case into the coupling groove formed in the first case; and
    pressing the holding stage formed on the first case by a pressing portion included in the second case to fix the bus bar held on the holding stage.

* * * * *